United States Patent [19]
Webb et al.

[11] Patent Number: 5,504,614
[45] Date of Patent: Apr. 2, 1996

[54] METHOD FOR FABRICATING A DMD SPATIAL LIGHT MODULATOR WITH A HARDENED HINGE

[75] Inventors: Douglas A. Webb, Phoenix, Ariz.; Bruce Gnade, Dallas, Tex.

[73] Assignee: Texas Instruments Incorporated, Dallas, Tex.

[21] Appl. No.: 381,254

[22] Filed: Jan. 31, 1995

[51] Int. Cl.$^6$ ................................................. G02B 26/08
[52] U.S. Cl. ........................ 359/223; 359/224; 359/230; 359/900; 427/523; 348/770
[58] Field of Search ..................... 359/224, 213, 359/230, 214, 291, 846, 847, 221, 900, 223, 298; 348/770–771; 427/523–531

[56] References Cited

U.S. PATENT DOCUMENTS

| | | | |
|---|---|---|---|
| 5,061,049 | 10/1991 | Hornbeck ................................. | 359/224 |
| 5,079,544 | 1/1992 | DeMond et al. ......................... | 340/701 |
| 5,096,279 | 3/1992 | Hornbeck et al. ...................... | 359/230 |
| 5,105,369 | 4/1992 | Nelson .................................... | 364/525 |
| 5,278,652 | 1/1994 | Urbanus .................................. | 358/160 |

OTHER PUBLICATIONS

Ser. No. 08/268,741, Knipe et al., filing date Jun. 30, 1994.
Ser. No. 08/283,496, Kaeriyama, filing date Jul. 29, 1994.

*Primary Examiner*—James Phan
*Attorney, Agent, or Firm*—Robert C. Klinger; James C. Kesterson; Richard L. Donaldson

[57] ABSTRACT

A method of fabricating a digital micromirror device (DMD) (10) spatial light modulator (SLM) with a hardened superstructure hinge (16). The invention comprises strengthening a hinge layer material (36) by ion implantation before etching the hinge layer material (36) to form the hinge (16), but could be implanted after etching the hinge (16). The ion implantation is applied with a predetermined energy to concentrate the implanted material (62) at the center of the hinge layer material (36). The entire process is performed using conventional robust semiconductor processes, at low temperatures. Through ion implantation, the DMD hinge (16) is strengthened to minimize or eliminate the possibility of creep. A combination of ions could be implanted if desired. The ion chosen is based on the solubility of the hinge material.

6 Claims, 3 Drawing Sheets

METHOD FOR FABRICATING A DMD SPATIAL LIGHT MODULATOR WITH A HARDENED HINGE

CROSS REFERENCE TO RELATED APPLICATIONS

Cross reference is made to the following Co-pending patent applications, each being assigned to the same assignee as the present invention, and the teachings included herein by reference:

| 08/268,741 | Improved Hinge for Micro-Mechanical Device | 06/30/94 |
|---|---|---|
| 08/283,486 | Improved support Post for Micro-Mechanical Devices | 07/29/94 |

TECHNICAL FIELD OF THE INVENTION

The present invention is generally related to fabricating a semiconductor spatial light modulator, and more particularly, to a method of fabricating a digital micromirror device (DMD) spatial light modulator (SLM) with a hardened hinge.

BACKGROUND OF THE INVENTION

A recent innovation of Texas Instruments Incorporated of Dallas Texas, is the digital micromirror device (DMD). The DMD is suitable for use in video displays, projectors and hard copy xerographic printers. The DMD is a monolithic single-chip integrated circuit spatial light modulator (SLM), comprised of a high density array of 17 micron square movable micromirrors. These micromirrors are fabricated over an address circuitry including an array of SRAM cells and address electrodes. Each mirror forms one pixel of the DMD array, and is bistable, that is to say, deflectable to one of two stable positions. A source of light directed upon and incident to the mirror array will be reflected in one of two directions as a function of the mirror position. In one stable "on" mirror position, incident light will be reflected to a collector lens and focused on a display screen in the case of a display, or to an exposure module, such as a photoreceptor drum, in the case of a hard copy printer. In the other "off" mirror position, incident light directed on the mirror will be deflected to a light absorber. Each mirror of the array is individually controlled to form a light image, this image being directed into the collector lens. For a display, the collector lens and a light prism ultimately focus and magnify the light image from the pixel mirrors onto a display screen and produce a viewable image. If each pixel mirror of the DMD array is in the "on" position, the light image will be an array of bright pixels.

For a more detailed discussion of the DMD device, cross-reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the light image is achieved by pulse width modulation techniques of the mirrors, such as that described in U.S. Pat. No. 5,278,652 entitled "DMD Architecture and Timing for Use in a Pulse-Width Modulated Display System" assigned to the same assignee as the present invention, and the teachings of which are incorporated herein by reference.

In one typical DMD device, each picture element (PIXEL) is typically comprised of a hinge suspended between a pair of support posts, this hinge supporting a 17 micron square mirror above underlying address circuitry. This mirror can be deflected in one of two directions by electrostatic forces generated by underlying electrodes controlled by address circuitry. This pixel is typically fabricated using semiconductor processes including sequentially depositing materials, such as using conventional sputtering techniques, and defining the various structural elements, such as by masking these layers and etching or ashing the exposed (unmasked) material.

The DMD hinge layers ultimately patterned into the hinges may be formed from a variety of metals including, but not limited to, aluminum, aluminum alloys, and titanium tungsten. This hinge metal material is usually deposited by sputtering to achieve a thickness of about 400 to 600 angstroms. Over time, these metal hinges may be become subject to creep because the hinges and beams are preferentially exercised in one direction more than the other, i.e. 75% of the time in one direction and 25% in the other. A hinge/beam exercised equally in both directions will not develop creep. With the current fabrication process, the deposited hinge metal material, such as aluminum alloy, is never exposed to high temperature processing. Therefore, there are few (if any) precipitates in the hinge material. Precipitation normally takes place only during elevated temperature processing. The high temperature process gives the atoms enough thermal energy to diffuse and coalesce at defects or dislocations, forming precipitates and/or intermetallics. The formation of precipitates help pin grain boundaries, reducing the tendency for the hinge material to creep. However, the conventional DMD superstructure, that is, the hinge, beam and support posts, if utilized, do not allow for the use of high temperature annealing exceeding about 400° C. to form precipitates. Therefore, alternative techniques for precipitation formation are desired to minimize or eliminate possible creep.

It is advantageous to reduce the chance for creep in a DMD device, since creep can lead to a preferential set of a DMD pixel mirror in one direction, which degrades device performance including reduced contrast ratios. It is also desirable to provide a robust fabrication process for providing a hardened hinge without the use of high temperature processing.

SUMMARY OF THE INVENTION

The present invention achieves technical advantages by ion implanting the DMD hinge during semiconductor processing. Preferably, before a deposited hinge layer material is masked and etched to define the hinge, the hinge layer material is ion implanted with a first material to cause precipitation. This precipitation helps pin grain boundaries of the hinge layer material, thus reducing the tendency for the hinge material layer to creep.

In the preferred embodiment of the present invention, a spatial light modulator is fabricated by first defining address circuitry on a substrate. Next, a hinge support structure, such as support posts, are defined on the substrate. Thereafter, a hinge layer material is deposited on the hinge support structure. Next, this hinge layer material is hardened by preforming ion implantation of the hinge layer material. Thereafter, a hinge is formed from the ion implanted hinge layer material. Finally, a picture element (pixel) is defined on this hinge which is deflectable in two directions over the address circuitry. The pixel may be coplanar with the hinge, or elevated in the case of the hidden hinge pixel designs.

Preferably, the hinge layer material is deposited by sputtering. This hinge layer material preferably consists of either aluminum, aluminum alloy, titanium tungsten, titanium nitride, titanium tungsten nitride, titanium aluminum nitride, chromium or tungsten, but is not limited to a specific material. In the preferred embodiment of the present invention, the hinge layer material is ion implanted with the first material at a predetermined energy to concentrate the implanted material at the center of the hinge layer material. In addition, a plurality of ion types could be implanted to achieve a desired combination. Moreover, it is desirable that the ion implantation procedure be performed with a sufficient localized energy to generate precipitation in the hinge layer material. The preferable ion implanted material is comprised of either oxygen, nitrogen, boron, carbon or a metal. However, limitations to these particular ion implanted materials is not to be inferred, for the present invention anticipates ion implanting the hinge material with any material that is deemed suitable to strengthen the chosen hinge layer material. Preferably, a species is chosen for implantation that has a low solubility in the particular hinge material. The lower the solubility, the higher the probability of precipitation. Use of heavier materials will have a tighter range of distribution. It is also conceived that other hinge layer materials can be implemented as well, each having desirable properties which are well suited for use in robust semiconductor processing techniques to achieve a hardened DMD superstructure.

DESCRIPTION OF THE PREFERRED EMBODIMENT

Figure 1:
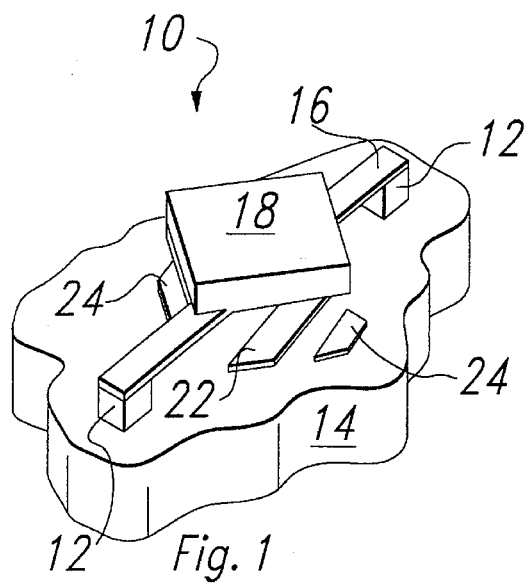
FIG. 1 is a perspective view of a picture element of a simple digital micromirror device (DMD) spatial light modulator (SLM) fabricated according to the method of the present invention, although more complex hidden hinge pixels are suitable.

Referring now to FIG. 1, one picture element (pixel) 10 is shown, this pixel 10 comprising one of thousands such pixels forming a linear or area array of pixels comprising a digital micromirror device (DMD) spatial light modulator (SLM). For purposes of illustration, a relatively simple pixel 10 is shown, although more complex hidden-hinge pixels can be formed according to the present invention, and may have an elevated mirror, and may have a modified post, or no post. Pixel 10 is seen to include a pair of vertically extending metal hinge support posts 12 formed upon a semiconductor wafer substrate 14 and supporting an elongated metal hinge 16 extending therebetween. Hinge 16 supports a reflectively coated beam 18 positioned therebetween operating as a mirror. Beam (mirror) 18 is supported over a pair of opposed addressing electrodes 22 and a pair of tip landing pads 24. Addressing circuitry fabricated on substrate 14 (not shown) includes an array of SRAM memory cells storing pixel position information, these memory cells usually being loaded by column data shift registers (not shown). When pixel 10 is addressed by row address circuitry (not shown), these memory cells transfer bias voltages to address electrodes 22 to electrostatically deflect mirror 18. These electrostatic forces created by voltages on address electrodes 22 cause beam 18 to rotate toward the address electrode 22 providing the greatest potential between the mirror and the electrode.

Figure 2:
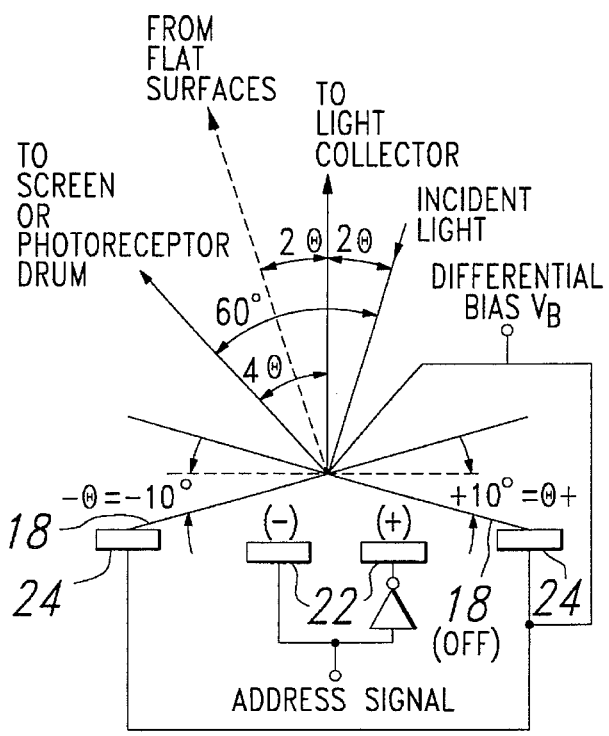
FIG. 2 is a diagram illustrating the optical path of the incident light reflected one of two directions by the pixel mirror of FIG. 1.

Referring to FIG. 2, beam mirror 18 is shown to be deflectable in one of two directions from horizontal by an angle θ. Mirror 18 is deflectable plus or minus 10 degrees from a flat orientation, as shown. In one orientation, incident light is directed to either a screen in the case of a backscreen T.V./Video monitor, or ultimately focused to an imaging photoreceptor drum in the case of an electrostatic printer. In the other orientation, light is directed to a light collector. Arrays of these pixels are modulated to form light images that are directed to a projection screen or the photoreceptor dream, as discussed more thoroughly in the cross referenced patents discussed in the section entitled Background of the Invention, these patents being assigned to the same assignee as the present invention, and the teachings of which are included herein by reference.

Figure 3:
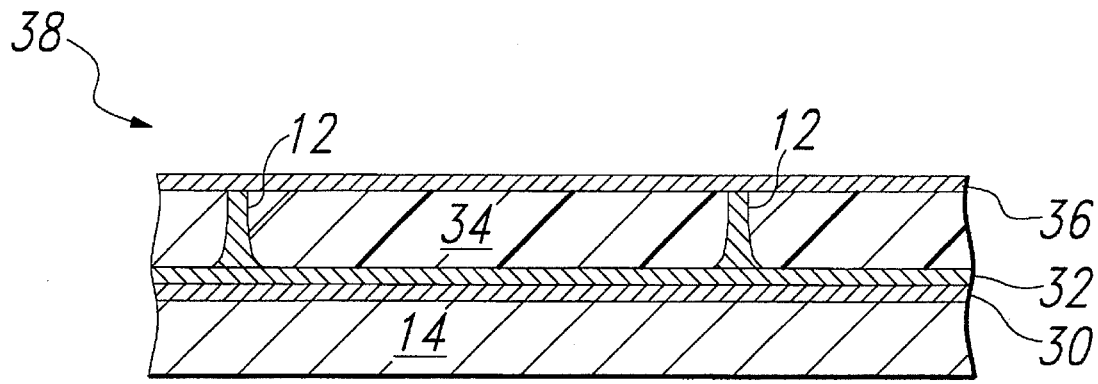
FIG. 3 is a cross section of a partially processed DMD pixel with the metal hinge layer deposited upon the hinge support posts and spacer layer, in preparation for being processed and hardened by ion implantation according to the present invention.

Turning now to FIG. 3, the process for fabricating the spatial light modulator pixel 10 of FIG. 1 according to the preferred embodiment of the present invention will be discussed.

First, an insulative oxide layer 30 is deposited upon substrate 14 whereby address circuitry including the memory cells and address electrodes 22 are formed from a multi-layer structure shown at 32. After planarizing structure 32, a pair of metallic support posts 12 are formed upon layer 32 by sputter depositing a metal layer, masking and etching this layer to realize the pair of spaced posts 12, as shown. Thereafter, a non-conductive spacer layer 34 is deposited about posts 32. The fabrication of device 10 discussed so far is well known in the art, and is discussed further in the cross referenced patents referenced in the section Background of the Invention, each patent being assigned to the same assignee of the present invention, and the teachings of which are included herein by reference.

With continued reference to FIG. 3, a metallic hinge layer 36 is sputter deposited upon spacer layer 34 and posts 12, as shown. Metal hinge layer 36 preferably comprises of aluminum or an aluminum alloy, but could also comprise of titanium tungsten (TiW) or other suitable hinge materials.

Preferably, hinge layer 36 has a thickness of about 500 angstroms. This partially processed wafer is generally shown at 38.

Figure 4:
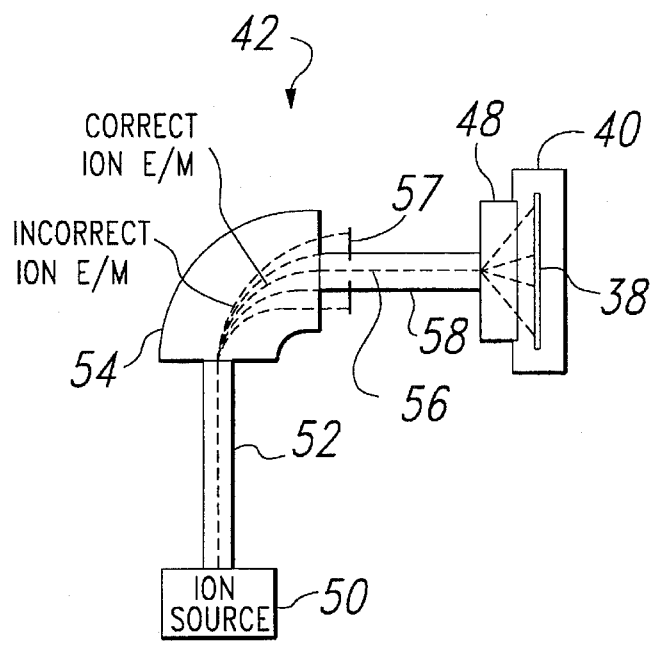
FIG. 4 is a block diagram of an ion implantation station for ion implanting the hinge layer material of FIG. 3.

Referring to FIG. 4, the wafer 38 as processed so far is positioned in a vacuum chamber 40 of an ion implantation station generally shown at 42. The processed wafer 38 is oriented so as to face the upper hinge layer 36 proximate a beam raster 48. Ion implantation station 42 is seen to include an ion source 50 and an acceleration tube 52 extending therefrom to a 90 degree analyzing magnet 54. An ion beam 56 generated by source 50 is accelerated by tube 52, with ions of correct E/M filtered by a slitted plate 57. The beam 56 is communicated to beam raster 48 and irradiates the exposed hinge layer 36 of wafer 38, as shown.

Any of a number of materials can be implanted by ion source 50, some of which are shown in Tables 1 and 2 below, for hinge material shown with a thickness of 500 angstroms. In addition, a combination of ions could be implanted to achieve a desired distribution, and limitation to implanting a single type of ion is not to be inferred.

TABLE 1

IMPLANTATION IN ALUMINUM

| ION | E(KeV) | RANGE (ANGSTROMS) | STRAGGLING (ANGSTROMS) |
| --- | --- | --- | --- |
| O | 13 | 296 | 157 |
| AlO | 33 | 307 | 117 |
| Si | 20 | 285 | 132 |
| Si | 22 | 310 | 143 |
| F | 10 | 299 | 140 |
| F | 11 | 326 | 151 |
| Mo | 45 | 279 | 82 |
| Mo | 50 | 301 | 87 |
| C | 9 | 272 | 159 |
| C | 10 | 300 | 171 |
| Sn | 50 | 286 | 77 |
| Sn | 55 | 305 | 82 |

TABLE 2

IMPLANTATION IN TiW

| ION | E(KeV) | RANGE (ANGSTROMS) | STRAGGLING (ANGSTROMS) |
| --- | --- | --- | --- |
| Co | 90 | 206 | 167 |
| Co | 100 | 226 | 182 |

Depending on the ion to be implanted, the ions are accelerated through tube 52, as shown in Tables 1 and 2. The acceleration tube 52 provides the energy to the ions. The analyzing magnet 54 selects ions with only the correct E/M ratio. This makes sure that only the correct ions are implanted in the hinge material. Ions with incorrect E/M are removed by slitted plate 57, as shown in FIG. 4. It is desirable to implant the ions as uniformly as possible in hinge layer 36, with a peak concentration preferably centered at the center of the hinge layer 36. In the preferred embodiment, with the hinge layer 36 having a thickness of 500 Angstroms, it is preferred to center the ion distribution between 250 and 300 Angstroms from the top surface of hinge layer 36. As shown in Tables 1 and 2, the energy level, shown in kilovolts (keV), is selected based on the ion chosen to center the concentration of ions in hinge layer 36.

Figure 5:
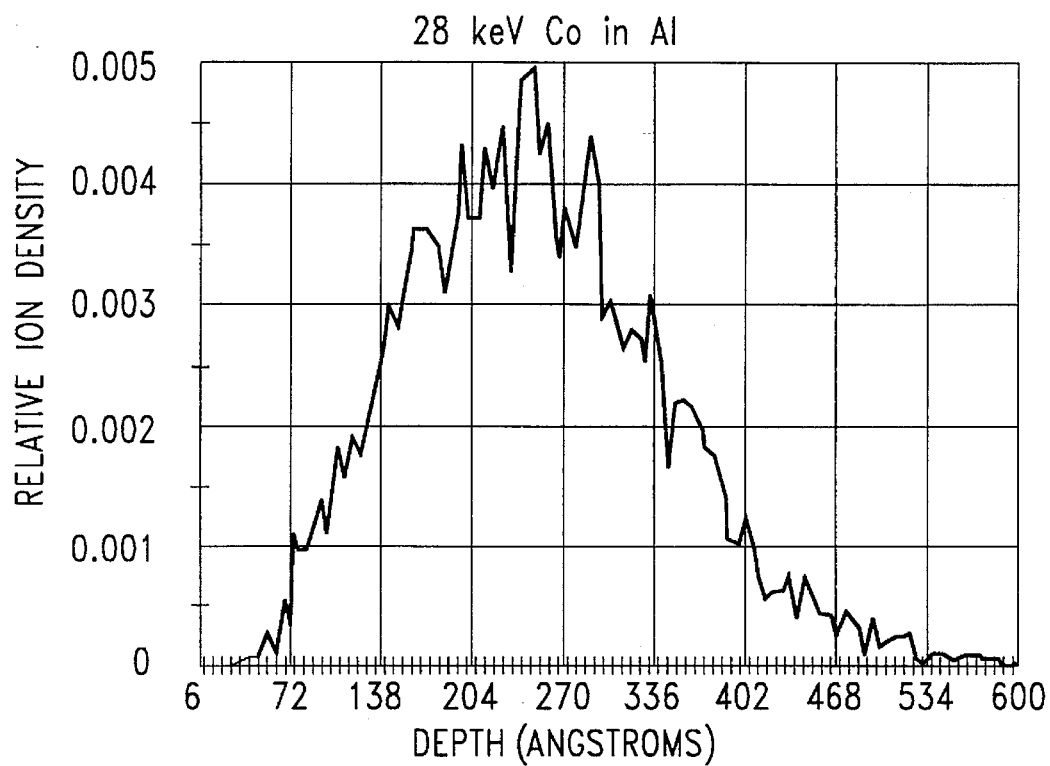
FIG. 5 is a graph illustrating the ion density distribution of Cobalt as a function of depth in an aluminum hinge material implanted at 28 keV.

Referring to FIG. 5, a typical distribution of cobalt (Co) ions implanted in an aluminum hinge layer 36 at 28 kilovolts is shown, with a relative density shown as a function of the depth in the hinge layer, wherein this expected distribution can be calculated according to well known scientific relationships. As shown, it can be seen that the peak concentration of ions is at a depth of about 250 Angstroms, which is approximately the center of the hinge layer material 36. By way of example, at this depth, the peak density is approximately 0.5% relative to the aluminum hinge material. The actual percentage of implanted ions is dependent on the dose that is implanted. The concentration is controlled by the energy used and the dose.

Figure 6:
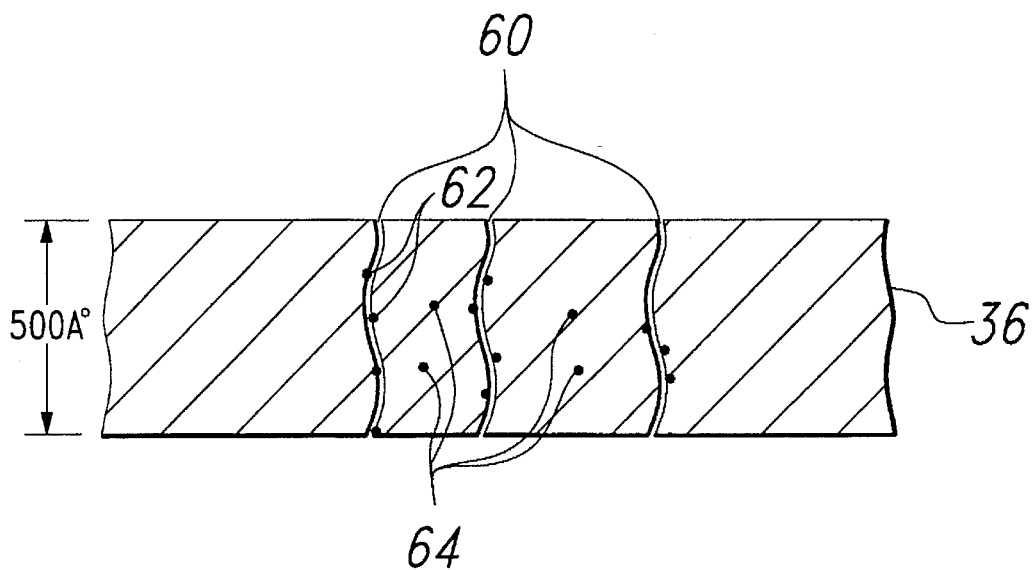
FIG. 6 is an enlarged cross sectional view of the hinge layer material after ion implantation, illustrating the intermetallic precipitates formed in the grain boundaries, thus strengthening the hinge layer material.

Referring to FIG. 6, an enlarged view of hinge layer 36 is shown after ion implantation. Hinge layer 36 is seen to have a plurality of columnar grains 60. The precipitates 62, comprised of many atoms, are positioned in the grains 60. These precipitates 62 are concentrated at the middle of layer 36, at a depth of approximately 250 Angstroms, as shown. However, a lower distribution of precipitates 62 can also be seen to be formed proximate the upper and lower surfaces of layer 36. Generally, the distribution of precipitates will follow a bell curve, as shown in FIG. 5. Precipitates 62 represent intermetallic precipitates. As shown at 64, it is also possible that intragranular precipitates could also form, although they are not as helpful as the intergranular precipitates. These intragrannlar precipitates can also help reduce creep in hinge 16 by pinning dislocations. However, hinge layer 36 can be implanted after etching the material to form hinges, and limitation to implantation before etching the hinges 16 is not to be inferred.

Figure 7:
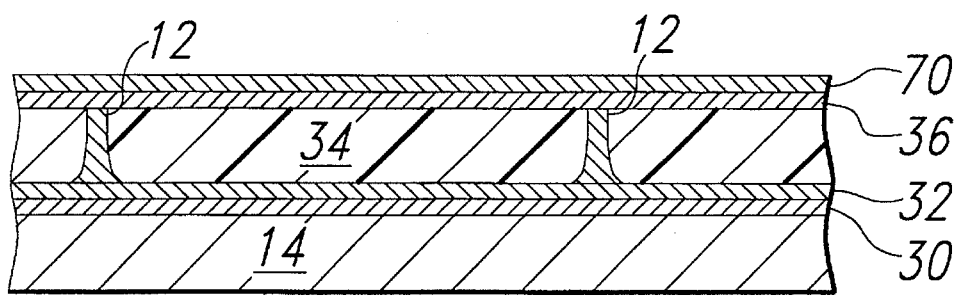
FIG. 7 is another cross sectional view of the partially processed wafer with an oxide mask formed upon the hinge layer material and patterned to define a hinge pattern.

Turning now to FIG. 7, wafer 38 is removed from vacuum chamber 40 and further processed by defining an oxide hard mask 70 upon hinge layer 36, as shown. Oxide hard mask 70 is patterned to form a hinge pattern, whereby the hinge layer 36, after having been implanted with ions, it is etched to define hinges 16. Thereafter, this oxide mask 70 is removed. However, in some processes, the hinge layer can be masked and then etched later, after the beam layer has been deposited. The beam and hinge can be formed in one step in some processes with a single etch step.

Figure 8:
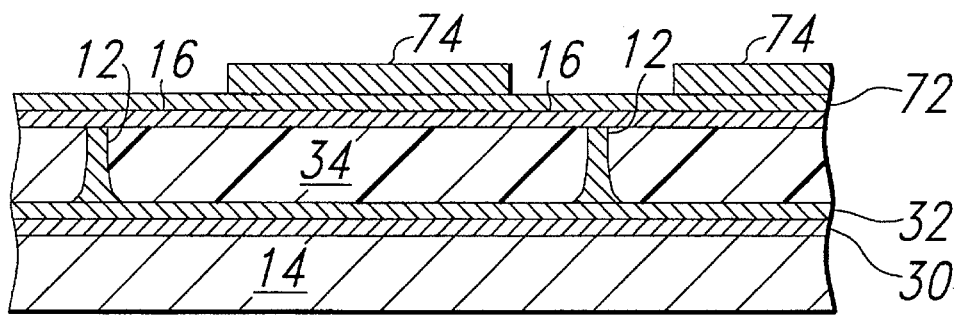
FIG. 8 is a cross sectional view of the further processed wafer illustrating the beam metal layer deposited upon the patterned hinge layer, with a beam pattern oxide mask defined upon the beam layer.

Turning now to FIG. 8, a metal beam layer 72 is deposited upon hinge 16 using conventional sputtering techniques. Preferably, beam layer 72 also comprises aluminum and is of identical material to that of hinge 16. Thereafter, a photoresist mask 74 is applied to beam layer 72 and patterned to form a beam pattern.

Figure 9:
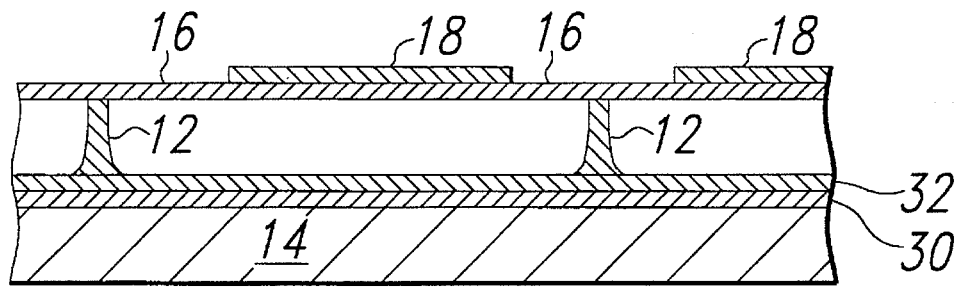
FIG. 9 is a cross sectional view of a completely processed wafer with the beam formed upon the ion implanted hinge and supported over the addressing circuitry.

Turning now to FIG. 9, the exposed beam layer 72 and unmasked portions of hinge 16 are etched away to realize beam 18, as shown in FIG. 9. Then, oxide mask 74 is removed. Since beam 18 is comprised of aluminum, it is reflective and comprises a mirror. Lastly, spacer layer 34 is undercut and removed using an ash process.

According to the method of the present invention, a hardened hinge 16 is provided which is less subject to creep over time. The ion implantation procedure forms intermetallic precipitates in the hinge layer grain boundaries 60 to strengthen the hinge layer material, and is preformed at room temperature thus making this technique suitable to the robust semiconductor processing techniques utilized to form pixel element 10. Aluminum is a suitable material for hinge 16 and beam 18 because it is amenable to semiconductor processing techniques. The distribution of ions implanted can be precisely controlled by carefully controlling the energy level of the ion beam, and the time duration of the implantation process determines the dose. Various ion sources can be chosen depending on which ion sources are more suitable for the particular hinge material utilized, based on the solubility and intermetallic formation characteristics. Ion implantation is a robust process, can be precisely controlled to achieve predictable distributions, and can be done rather quickly compared to the overall processing for the DMD device.

Though the invention has been described with respect to a specific preferred embodiment, many variations and modifications will become apparent to those skilled in the art upon reading the present application. It is therefor the intention that the appended claims be interpreted as broadly as possible in view of the prior art to include all such variations and modifications. For instance, other hinge layer materials could be used, with suitable compatible ions implanted therein to strengthen the hinge layer. Moreover, limitations to the particular DMD design is not to be inferred, for other DMD pixels, including pixels having elevated reflective beams, could be fabricated as well with strengthened hinges. The hinge layer can be implanted before or after etching when forming the hinges, and limitation to the particular fabrication process utilized is not to be inferred. The ion, or combination of ions implanted, depends on the solubility desired and is based on the hinge material chosen.

We claim:

1. A method of fabricating a spatial light modulator, comprising the steps of:

a) defining address circuitry on a substrate;

b) defining a hinge support structure on said substrate;

c) depositing a hinge layer material on said hinge support structure;

d) ion implanting said hinge layer material with a first material;

e) defining a hinge from said ion implanted hinge layer material; and f) defining a picture element on said hinge which is deflectable in two directions over said address circuitry.

2. The method as specified in claim 1 comprising the step of ion implanting said first material in said hinge layer material with a predetermined energy to concentrate said implanted first material at a center of said hinge layer material.

3. The method as specified in claim 2 wherein said hinge layer material is deposited by sputtering.

4. The method as specified in claim 3 wherein said hinge layer material consists of either aluminum, an aluminum alloy, titanium tungsten, titanium nitride, titanium tungsten nitride, titanium aluminum nitride, chromium or tungsten.

5. The method as specified in claim 1 wherein said ion implanted material is comprised of at least one of either oxygen, nitrogen, boron, carbon, a metal, a metal oxide, nitride or carbide.

6. The method as specified in claim 5 wherein a plurality of ion types are implanted to form a combination implantation.

\* \* \* \* \*